United States Patent
Cases et al.

(10) Patent No.: US 7,868,652 B1
(45) Date of Patent: Jan. 11, 2011

(54) OFF-DIE TERMINATION MODULE WITH A SPRING LOADED PIN IN A DIMM SOCKET

(75) Inventors: Moises Cases, Austin, TX (US); Bhyrav M. Mutnury, Austin, TX (US); Nam H. Pham, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/632,864

(22) Filed: Dec. 8, 2009

(51) Int. Cl.
*H03K 17/16* (2006.01)
(52) U.S. Cl. .......................................... 326/30; 326/21
(58) Field of Classification Search .................. 326/21, 326/26, 27, 30
See application file for complete search history.

(56) References Cited

U.S. PATENT DOCUMENTS

| | | | |
|---|---|---|---|
| 5,483,573 A | 1/1996 | Steenton et al. | |
| 5,734,208 A | 3/1998 | Jones | |
| 6,089,903 A | 7/2000 | Stafford Gray et al. | |
| 6,215,686 B1 | 4/2001 | Deneroff et al. | |
| 6,390,840 B1 | 5/2002 | Wang | |
| 6,456,139 B1 | 9/2002 | Pelissier et al. | |
| 6,567,877 B1 | 5/2003 | Lewis et al. | |
| 6,634,889 B2 | 10/2003 | Miller et al. | |
| 6,882,082 B2 | 4/2005 | Greeff et al. | |
| 2006/0056215 A1* | 3/2006 | Petersen et al. | ............... 365/51 |
| 2007/0080767 A1 | 4/2007 | Kuzmenka | |
| 2008/0256281 A1* | 10/2008 | Fahr et al. | ................... 710/305 |
| 2008/0316220 A1 | 12/2008 | Chen et al. | |

\* cited by examiner

*Primary Examiner*—Don P Le
(74) *Attorney, Agent, or Firm*—Brandon C. Kennedy; Tom Tyson; Biggers & Ohanian, LLP.

(57) ABSTRACT

Off-die termination module for terminating memory module signal lines in a computer memory subsystem, the computer memory subsystem including a memory controller and a DIMM socket, the memory controller coupled to the DIMM socket via a memory module signal line, the off-die termination module including: an off-die termination component configured to terminate the memory module signal line upon activation; and a spring loaded notch pin implemented as part of the DIMM socket, the spring loaded notch pin configured to toggle activation of the off-die termination component in dependence upon presence of a DIMM in the DIMM socket including activating the off-die termination component upon removal of a DIMM from the DIMM socket and deactivating the off-die termination component upon installation of a DIMM in the DIMM socket.

20 Claims, 4 Drawing Sheets

OFF-DIE TERMINATION MODULE WITH A SPRING LOADED PIN IN A DIMM SOCKET

BACKGROUND OF THE INVENTION

1. Field of the Invention

The field of the invention is data processing, or, more specifically, methods, computer memory subsystems, and off-die termination modules for terminating memory module signal lines.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

Computer systems today have increasingly more powerful processors and increasingly greater memory use. Many computer systems have one or more DIMM sockets in which computer memory in the form of a DIMM is installed. In some computers, a DIMM may be installed but not used. In these cases, on-die termination ('ODT') within the memory modules of the DIMM itself is employed to terminate the signal lines of a memory bus in the DIMM socket. If not terminated, the signal lines form stub lines and cause signal reflection.

When a DIMM is not installed in a socket, however, the on-die terminators are removed and there are few options to terminate the signal lines. One way currently employed to terminate such signal lines when a DIMM is not installed in a socket is by using a dummy DIMM that employs ODT but cannot be accessed by a memory controller for typical memory operations—reads, writes, and so on. Dummy DIMMs, however, increase the operational cost of each computer and create a logistical issue, especially in large data centers housing a great number of servers, due to the fact that each dummy DIMM must be physically installed in a socket by a human user.

SUMMARY OF THE INVENTION

Methods, computer memory subsystems, and off-die termination modules for terminating memory module signal lines in a computer memory subsystem are disclosed. The computer memory subsystem includes a memory controller and a Dual In-Line Memory Module ('DIMM') socket installed on a printed circuit board ('PCB'). The memory controller is electrically coupled to the DIMM socket via a memory module signal line. The off-die termination module includes an off-die termination component configured to terminate the memory module signal line upon activation. The off-die termination module also includes a spring loaded notch pin implemented as part of the DIMM socket. The spring loaded notch pin is configured to toggle activation of the off-die termination component in dependence upon presence of a DIMM in the DIMM socket. Toggling activation of the off-die termination component includes activating the off-die termination component upon removal of a DIMM from the DIMM socket and deactivating the off-die termination component upon installation of a DIMM in the DIMM socket.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
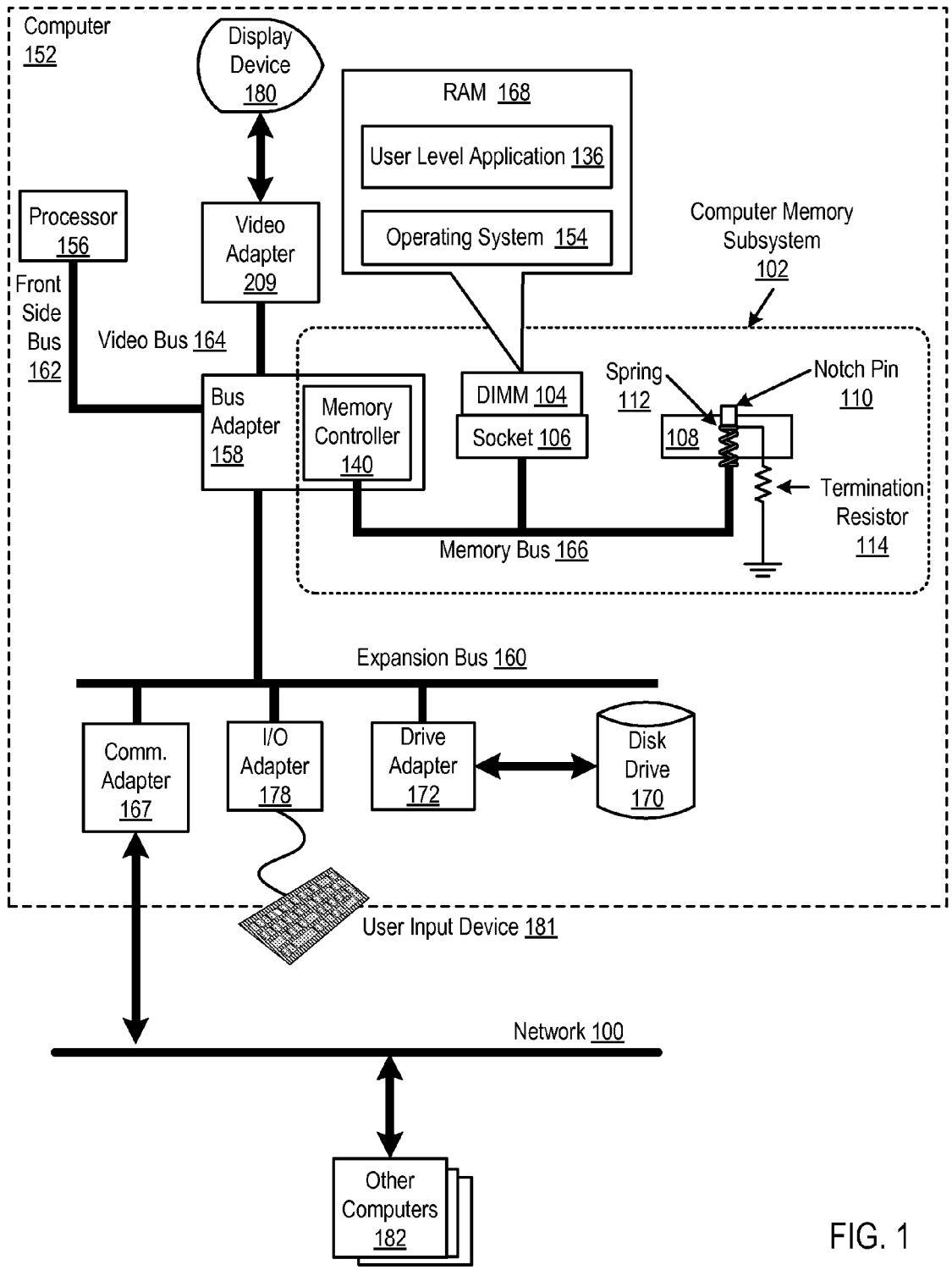
FIG. 1 sets forth a network diagram of a system in which a computer memory subsystem includes off-die termination of memory module signal lines according to embodiments of the present invention.

Exemplary methods, computer memory subsystems, and off-die termination modules for terminating memory module signal lines in accordance with embodiments of the present invention are described with reference to the accompanying drawings, beginning with FIG. 1. FIG. 1 sets forth a network diagram of a system in which a computer memory subsystem includes off-die termination of memory module signal lines according to embodiments of the present invention. The term off-die generally describes a location of a terminating a signal line. Off-die is used here in contrast to the common technique of "on-die" termination.

On-die termination (ODT) describes technology in which a termination resistor for impedance matching in transmission lines is located inside a semiconductor chip instead of on a printed circuit board. In lower frequency applications, interconnection lines may be modeled as lumped circuits. In this case there is no need to consider the concept of termination. Under the low frequency condition, every point in an interconnect wire can be assumed to have the same voltage as every other point for any instance in time and there is no need to consider the concept of termination.

If the propagation delay in a wire or interconnect is greater than approximately one sixth of the rise time of the digital signal, then the lumped circuit model is no longer valid and the interconnect has to be analyzed as a transmission line. In a transmission line the interconnect is modeled as a circuit with distributed inductance, capacitance, and resistance.

In order for a transmission line to have as clean signal as possible the distributed impedance of the every point of the transmission line should be uniform, ideally. If there is any point where the impedance of the transmission line is not uniform because of a disconnection, discontinuity, or different material, then a signal traveling along the transmission line may be affected from noise such as signal reflection, distortion, ringing, and so on.

When a signal path has an impedance discontinuity, an impedance mismatch, then a termination impedance may be placed at the point of line discontinuity. The termination impedance is referred to as termination. For example, resistors may be placed on computer motherboards to terminate high speed busses. In on-die termination technologies, the termination is located inside a semiconductor chips rather than having the necessary resistive termination located on the motherboard.

In contrast to on-die termination, methods of off-die termination as described here terminate a signal line not on a semiconductor die itself, but rather off the semiconductor die. In some embodiments, off-die termination may occur in a socket, on a motherboard, or some combination of the two.

The system of FIG. 1 includes automated computing machinery comprising an exemplary computer (152) having a computer memory subsystem configured for off-die termination according to embodiments of the present invention. The computer memory subsystem (102) of FIG. 1 includes a memory controller (140) implemented as part of a bus adapter (158). The computer memory subsystem (102) also includes two DIMM sockets (106, 108) installed on a printed circuit board ('PCB') or a motherboard. Installed in one of the DIMM sockets (106) is a DIMM (104). The DIMM includes one or more Random Access Memory ('RAM') (168) modules. The sockets (106, 108) are coupled to a memory controller (140) by a number of a memory module signal lines depicted in the example of FIG. 1 as a high speed memory bus (166). A memory module signal line may be any signal line in a DIMM socket that couples a DIMM installed in the DIMM socket to a memory controller. Such signal lines may include data read or write signal lines, memory address signal lines, or other signal lines as will occur to readers of skill in the art. In some embodiments of the present invention the term "memory module signal line" refers to signal line stubs present in a DIMM socket. Such stubs, if not terminated, propagate signal reflection and other signal noise in the signal lines.

The computer memory subsystem (102) of FIG. 1 also includes an off-die termination module for terminating memory module signal lines (166) in accordance with embodiments of the present invention. The termination module of FIG. 1 includes a termination resistor (114), an off-die termination component configured to terminate the memory module signal line upon activation. The termination module of FIG. 1 also includes a spring (112) loaded notch pin (110) implemented as part of the DIMM socket (108). That is, the example off-die termination module of FIG. 1 consists of the spring (112) loaded notch pin (110) and the termination resistor (114). The spring (112) loaded notch pin (110) is configured to toggle activation of the off-die termination component, the termination resistor (114), in dependence upon presence of a DIMM in the DIMM socket (108). The spring (112) loaded notch pin (110) may toggle activation of the termination resistor (114) by activating the termination resistor (114) upon removal of a DIMM from the DIMM socket (108) and deactivating the termination resistor (114) upon installation of a DIMM in the DIMM socket (108). Activating the termination resistor (114) includes coupling the memory module signal line (166), to the iteration resistor (114) which couples the memory module signal line (166) to ground. Although only one termination resistor (114) is depicted in the example of FIG. 1 readers of skill in the art will recognize that many such termination resistors may be implemented in computer memory subsystems for off-die termination of memory module signal lines in accordance with embodiments of the present invention.

The RAM (168) of the example computer (152) of FIG. 1 is connected through a high speed memory bus (166) and bus adapter (158) to at least one processor (156), or 'CPU,' and to other components of the computer (152). Stored in RAM (168) is a user level application (136), a module of computer program instructions for carrying out user level data processing tasks. Examples of user level applications include word processor applications, spreadsheet applications, multimedia library applications, multimedia playback applications, database management applications, and so on as will occur to readers of skill in the art. Also stored in RAM (168) is an operating system (154). Operating systems useful in computers having a computer memory subsystem including off-die termination of memory module signal lines according to embodiments of the present invention include UNIX™, Linux™, Microsoft XP™, AIX™, IBM's i5/OS™, and others as will occur to those of skill in the art. The operating system (154) and user level application (136) in the example of FIG. 1 are shown in RAM (168), but many components of such software typically are stored in non-volatile memory also, such as, for example, on a disk drive (170).

The computer (152) of FIG. 1 includes disk drive adapter (172) coupled through expansion bus (160) and bus adapter (158) to processor (156) and other components of the computer (152). Disk drive adapter (172) connects non-volatile data storage to the computer (152) in the form of disk drive (170). Disk drive adapters useful in computers that include a computer memory subsystem having off-die termination of memory module signal lines according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computer (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computer (152) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary computer (152) of FIG. 1 includes a communications adapter (167) for data communications with other computers (182) and for data communications with a data communications network (100). Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful in computers that include a computer memory subsystem having off-die termination of memory module signal lines according to embodiments of the present invention include modems for wired dial-up communications, Ethernet (IEEE 802.3) adapters for wired data communications network communications, and 802.11 adapters for wireless data communications network communications.

The arrangement of computers and other devices making up the exemplary system illustrated in FIG. 1 are for explanation, not for limitation. Data processing systems useful according to various embodiments of the present invention may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1.

Figure 2A:
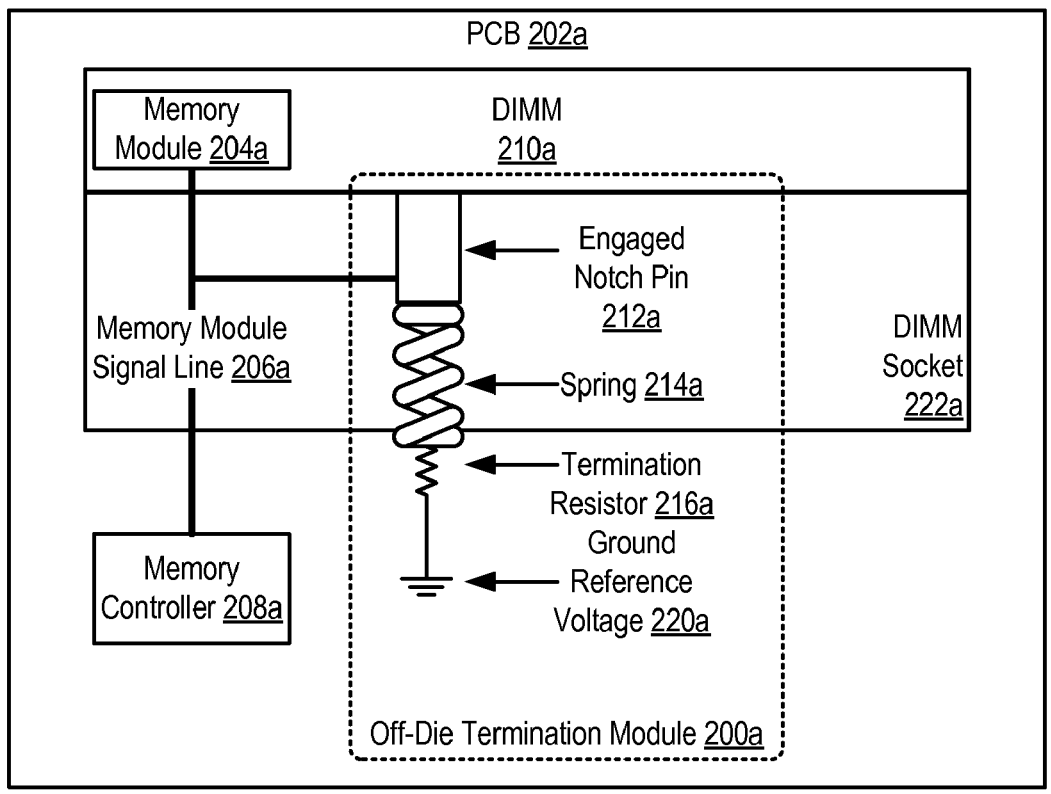
FIG. 2A sets forth a block diagram of a system including an exemplary off-die termination module for terminating memory module signal lines in a computer memory subsystem according to embodiments of the present invention.

For further explanation, FIG. 2A sets forth a block diagram of a system including an exemplary off-die termination module for terminating memory module signal lines in a computer memory subsystem according to embodiments of the present invention. The example system of FIG. 2A includes a computer memory subsystem that in turn includes a memory controller (208a) and a DIMM socket (222a) installed on a PCB (202a). The memory controller (208a) is electrically coupled to the DIMM socket (208a) via a memory module signal line (206a).

The example off-die termination module (200a) includes a spring (214a) loaded notch pin (212a) implemented as part of the DIMM socket (222a). The spring (214a) loaded notch pin (212a) is non-conductive and is configured to toggle activation of a termination resistor (216a) in dependence upon presence of a DIMM (210a) in the DIMM socket (222a). The spring (214a) loaded notch pin (212a) may toggle activation of the termination resistor (216) by activating the termination resistor (216a) upon removal of the DIMM (210a) from the DIMM socket (222a) and deactivating the termination resistor (216a) upon installation of the DIMM (210a) in the DIMM socket (222a).

The example off-die termination module (200a) of FIG. 2A also includes an off-die termination component—a termination resistor component. In the example of FIG. 2A, the termination resistor component is depicted as a termination resistor (216a) for clarity of explanation, not limitation. As explained in greater detail below with respect to FIGS. 3A and 3B, a termination resistor component useful in off-die termination modules according to embodiments of the present invention may be implemented in other ways in addition to a termination resistor.

The spring (214a), in the example of FIG. 2, is conductive and is configured to electrically couple the memory module signal line (206a) to a ground reference voltage (220a) through the termination resistor (216a) upon removal of the DIMM (210a) from the DIMM socket (222a).

In the example system of FIG. 2A, the DIMM (210a) is installed in the DIMM socket (222a). The DIMM, when installed in the DIMM socket (222a), engages the notch pin (212a). That is, the DIMM exerts pressure on the notch pin (212a), depressing the notch pin. In this state, the termination resistor (216a) is not activated because the termination resistor (216a) is not electrically coupled through the spring (214a) to the memory module signal line (206a).

In the example off-die termination module (200a) of FIG. 2A the spring (214a) loaded notch pin (212a) is located in a guide notch location of the DIMM socket. The term 'guide notch' refers to a notch on common DIMMs that couples with a raised portion of a DIMM socket. The guide notch and raised portion of the socket insures that DIMM types are only installed in compatible sockets. That is, DIMMs of different types may have guide notch in different positions. In sockets having a spring loaded notch pin located in the sockets' guide notch location according to embodiments of the present invention, the spring loaded notch pin effectively replaces the raised portion of DIMM sockets of the prior art.

Figure 2B:
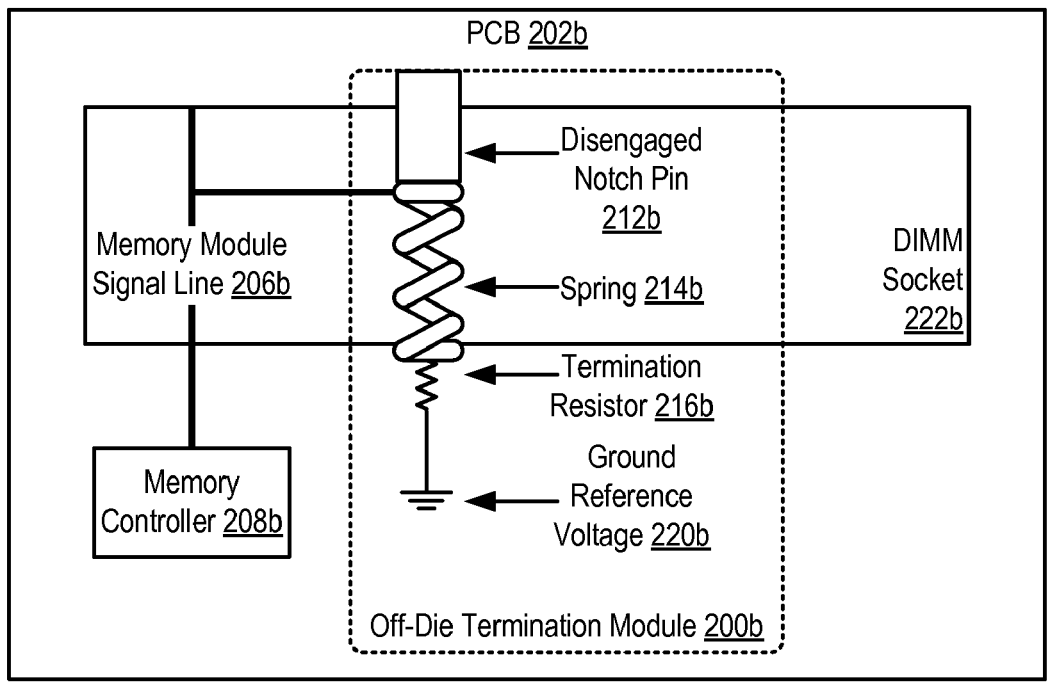
FIG. 2B sets forth a block diagram of a system including a further exemplary off-die termination module for terminating memory module signal lines in a computer memory subsystem according to embodiments of the present invention.

For further explanation, FIG. 2B sets forth a block diagram of a system including an further exemplary off-die termination module for terminating memory module signal lines in a computer memory subsystem according to embodiments of the present invention. The example system of FIG. 2B is similar to the system of FIG. 2A, where similar components are identified by similar reference numerals—FIG. 2A including reference numerals ending in 'a' and FIG. 2B including reference numerals ending in 'b.'

The system of FIG. 2B, like that of 2A, includes a computer memory subsystem that in turn includes a memory controller (208b) and a DIMM socket (222b) installed on a PCB (202b). The memory controller (208b) is electrically coupled to the DIMM socket (208b) via a memory module signal line (206b). The example off-die termination module (200b) includes a spring (214b) loaded notch pin (212b) implemented as part of the DIMM socket (222b). The example off-die termination module (200b) of FIG. 2B also includes an off-die termination component consisting of a termination resistor (216b). The spring (214b), in the example of FIG. 2, is conductive and is configured to electrically couple the memory module signal line (206b) to a ground reference voltage (220b) through the termination resistor (216b) upon removal of the DIMM from the DIMM socket (222b).

The system of FIG. 2B differs from the system of FIG. 2A, however, in that in the system of FIG. 2B, the notch pin (212b) is disengaged. That is, no DIMM is installed in the DIMM socket (222b), the notch pin (212b) is not depressed, and the spring (214b) is fully extended. When a DIMM is removed from the DIMM socket (222b) of FIG. 2B, the spring (214b) loaded notch pin (212b) receives a reduction in pressure exerted on the spring loaded notch pin and responsive to the reduction in pressure, the spring (214b) electrically couples the memory module signal line (206b) to a ground reference voltage through the termination resistor (216b).

Figure 3A:
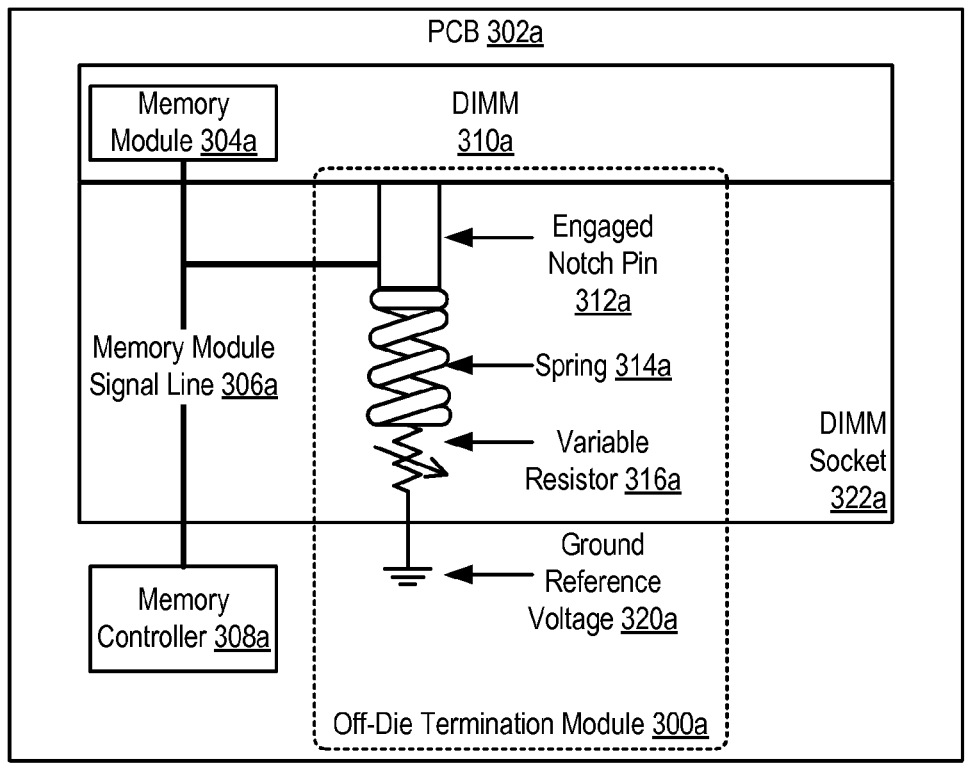
FIG. 3A sets forth a block diagram of a system including a further exemplary off-die termination module for terminating memory module signal lines in a computer memory subsystem according to embodiments of the present invention.
Figure 3B:
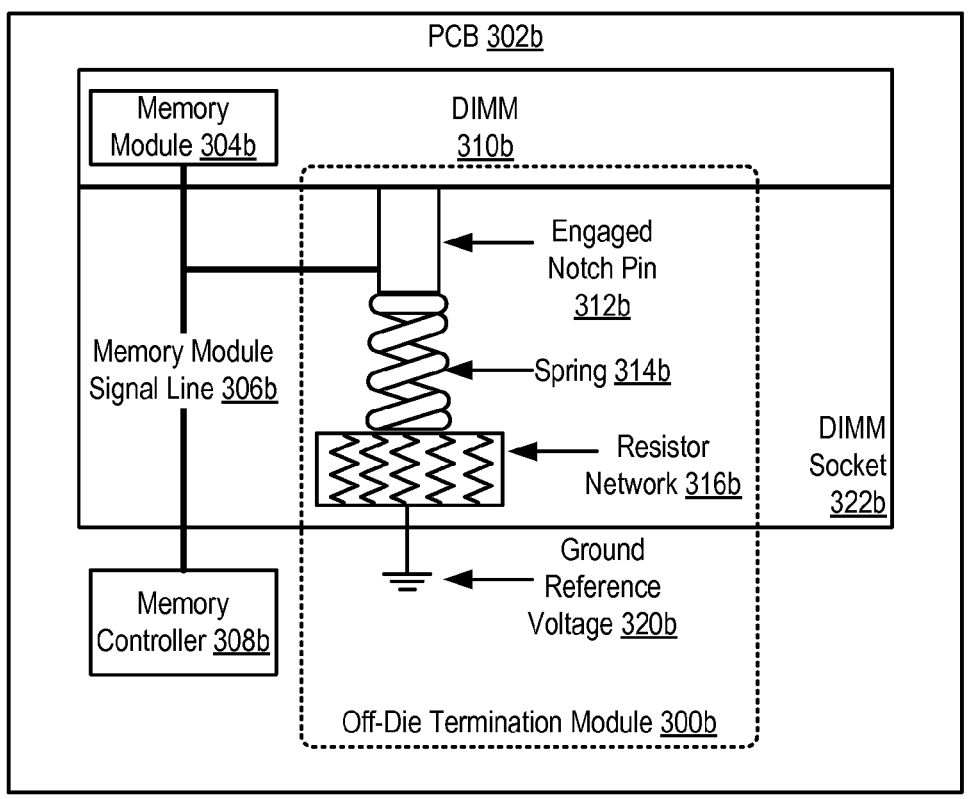
FIG. 3B sets forth a block diagram of a system including a further exemplary off-die termination module for terminating memory module signal lines in a computer memory subsystem according to embodiments of the present invention.

The example systems of FIGS. 2A and 2B depict termination components implemented as termination resistors (216a, 216b). Further, the termination components are implemented on the PCB (202a). FIGS. 3A and 3B set forth alternative embodiments of termination components in off-die termination modules configured in accordance with embodiments of the present invention.

For further explanation, therefore, FIG. 3A sets forth a block diagram of a system including an further exemplary off-die termination module for terminating memory module signal lines in a computer memory subsystem according to embodiments of the present invention. The system of FIG. 3A is similar to the system of FIG. 2A in that the system of FIG. 3A includes a computer memory subsystem that in turn includes a memory controller (308a) and a DIMM socket (322a) installed on a PCB (302a). The memory controller (308a) is electrically coupled to the DIMM socket (308a) via a memory module signal line (306a). The example off-die termination module (300a) includes a spring (314a) loaded notch pin (312a) implemented as part of the DIMM socket (322a).

The example system of FIG. 3A differs from the system of FIG. 2A, however, in that the off-die termination module (300a) of FIG. 3A includes an off-die termination component consisting of a variable resistor (316a). The variable resistor (316a) of FIG. 3A enables a systems administrator or other user to modify the resistance to be used in terminating the memory module signal line (306a).

The example system of FIG. 3A also differs from the system of FIG. 2A in that the off-die termination component is implemented as part of the DIMM socket (322a) itself rather than on the PCB (302a). Having a socket (322a) implemented with a complete off-die termination module (300a) according to embodiments of the present invention enables computer and server manufacturers and vendors to incorporate the off-die termination methods according to embodiments of the present invention with no modification to current computer motherboards or current DIMMs.

For further explanation, FIG. 3B sets forth a block diagram of a system including an further exemplary off-die termination module for terminating memory module signal lines in a computer memory subsystem according to embodiments of the present invention. The system of FIG. 3B is similar to the system of FIG. 2A in that the system of FIG. 3B includes a computer memory subsystem that in turn includes a memory controller (308b) and a DIMM socket (322b) installed on a PCB (302b). The memory controller (308b) is electrically coupled to the DIMM socket (308b) via a memory module signal line (306b). The example off-die termination module (300b) includes a spring (314b) loaded notch pin (312b) implemented as part of the DIMM socket (322b).

The example system of FIG. 3B differs from the system of FIG. 2A, however, in that the off-die termination module (300b) of FIG. 3B includes an off-die termination component consisting of a programmable resistor network (316b). A programmable resistor network (316b) enables a system management application, basic input/output services (BIOS) module, firmware, an operating system or other module of automated computing machinery to select and set a particular resistance to be used to terminate the memory module signal line (306b).

The example system of FIG. 3B also differs form the system of FIG. 2A in that the off-die termination component is implemented as part of the DIMM socket (322b) itself rather than on the PCB (302b). As mentioned above, having a socket (322b) implemented with a complete off-die termination module (300b) according to embodiments of the present invention enables computer and server manufacturers and vendors to incorporate the off-die termination methods according to embodiments of the present invention with no modification to current computer motherboards or current DIMMs.

Figure 4:
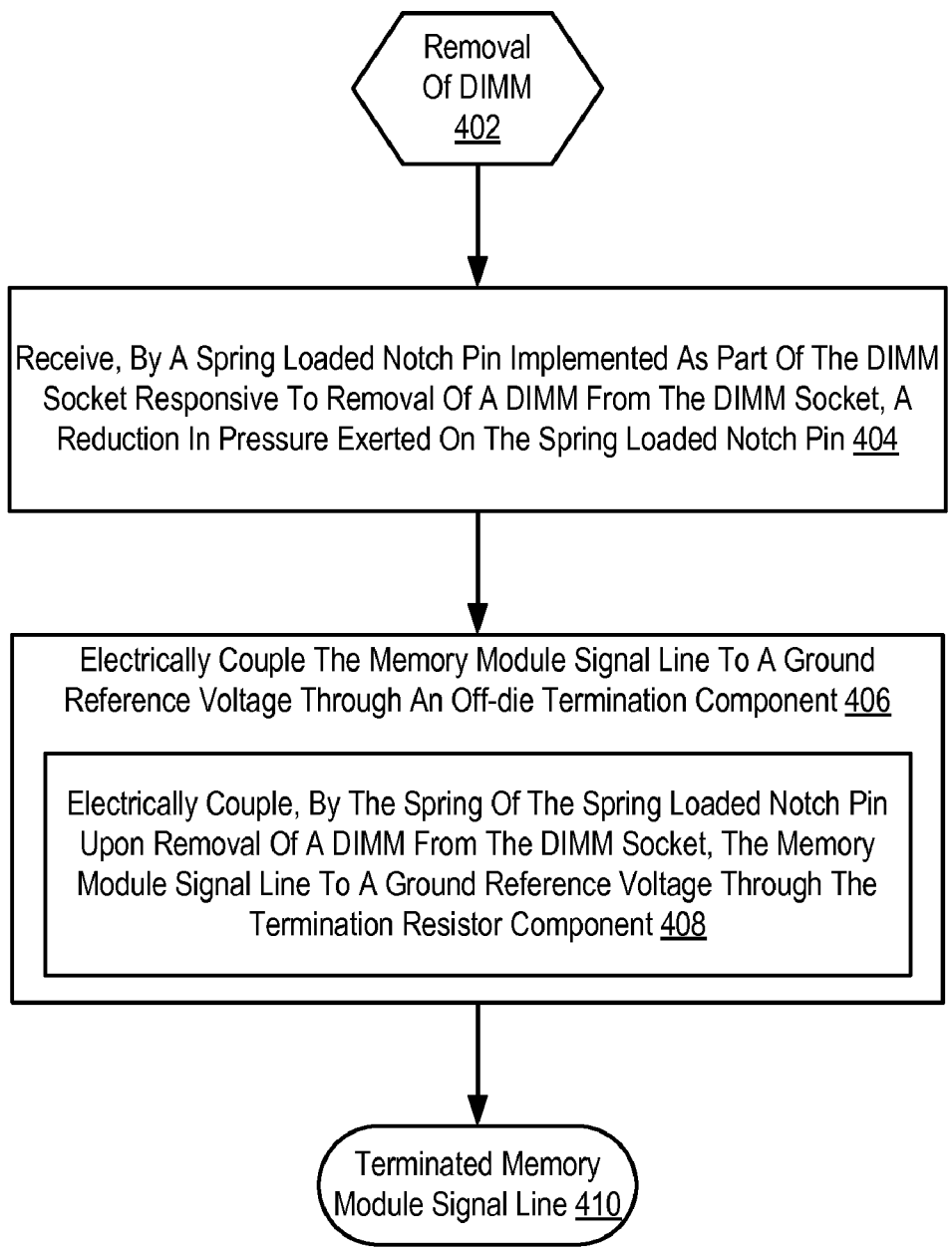
FIG. 4 sets forth a flow chart illustrating an exemplary method of off-die termination of memory module signal lines in a computer memory subsystem according to embodiments of the present invention.

For further explanation, FIG. 4 sets forth a flow chart illustrating an exemplary method of off-die termination of memory module signal lines in a computer memory subsystem according to embodiments of the present invention. In the method of FIG. 4, the computer memory subsystem includes a memory controller and a DIMM socket. The memory controller is electrically coupled to the DIMM socket via a memory module signal line.

The method of FIG. 4 includes receiving (404), by a spring loaded notch pin implemented as part of the DIMM socket responsive to removal (402) of a DIMM from the DIMM socket, a reduction in pressure exerted on the spring loaded notch pin. In some embodiments of the present invention the spring loaded notch pin is located in a guide notch location of the DIMM socket. When a DIMM is installed in the DIMM socket that includes the spring loaded notch pin in accordance with embodiments of the present invention, the DIMM depresses the notch pin and spring decoupling the spring from the memory module signal line. The opposite occurs when the DIMM is removed—the DIMM no longer depresses the notch pin and spring and the spring expands.

Responsive to the reduction in pressure, the method of FIG. 4 electrically couples (406) the memory module signal line to an off-die termination component. In the method the off-die termination component includes a spring of the spring loaded notch pin and a termination resistor component. Also in the method of FIG. 4 electrically coupling (406) the memory module signal line to an off-die termination component is carried out by electrically coupling (408), by the spring of the spring loaded notch pin upon removal of a DIMM from the DIMM socket, the memory module signal line to a ground reference voltage through the termination resistor component. In some embodiments of the method of FIG. 4, the termination resistor component may be implemented as a programmable resistor network, a variable resistor, a potentiometer, or a resistor.

In some embodiments of the present invention, the off-die termination component is implemented as part of the DIMM socket. In other embodiments of the present invention, the off-die termination component is implemented on the PCB.

Upon electrically coupling (406) the memory module signal line to an off-die termination component in the method of FIG. 4, the memory module signal line is terminated (410). Such termination may reduce signal reflection and other types of signal noise which would otherwise be generated by a non-terminated memory module signal line.

In view of the explanations set forth above, readers will recognize that the benefits of off-die termination of memory module signal lines in a computer subsystem according to embodiments of the present invention include:
Reducing signal reflection in DIMM sockets having no DIMM installed;
Improving DIMM sockets for off-die termination without modification of common DIMMs; and
Enabling termination of stub lines in a DIMM socket without use of a dummy DIMM.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of off-die termination of memory module signal lines in a computer memory subsystem, the computer memory subsystem comprising a memory controller and a Dual In-Line Memory Module ('DIMM') socket, the memory controller electrically coupled to the DIMM socket via a memory module signal line, the method comprising:
receiving, by a spring loaded notch pin implemented as part of the DIMM socket responsive to removal of a DIMM from the DIMM socket, a reduction in pressure exerted on the spring loaded notch pin; and
responsive to the reduction in pressure, electrically coupling the memory module signal line to a ground reference voltage through an off-die termination component.

2. The method of claim 1 wherein the off-die termination component comprises part of the DIMM socket.

3. The method of claim 1 wherein the off-die termination component is implemented on the PCB.

4. The method of claim 1 wherein the spring loaded notch pin is located in a guide notch location of the DIMM socket.

5. The method of claim 1 wherein:
the off-die termination component comprises a termination resistor component; and
coupling the memory module signal line to an off-die termination component further comprises electrically coupling, by a spring of the spring loaded notch pin upon removal of a DIMM from the DIMM socket, the memory module signal line to the termination resistor component and a ground reference voltage.

6. The method of claim 5 wherein the termination resistor component comprises a programmable resistor network.

7. An off-die termination module for terminating memory module signal lines in a computer memory subsystem, the computer memory subsystem comprising a memory controller and a Dual In-Line Memory Module ('DIMM') socket installed on a printed circuit board ('PCB'), the memory controller electrically coupled to the DIMM socket via a memory module signal line, the off-die termination module comprising:
an off-die termination component configured to terminate the memory module signal line upon activation; and
a spring loaded notch pin implemented as part of the DIMM socket, the spring loaded notch pin configured to toggle activation of the off-die termination component in dependence upon presence of a DIMM in the DIMM socket including activating the off-die termination component upon removal of a DIMM from the DIMM socket and deactivating the off-die termination component upon installation of a DIMM in the DIMM socket.

8. The method of claim 7 wherein the spring loaded notch pin is configured to toggle activation of the off-die termination component in dependence upon presence of a DIMM in the DIMM socket by, receiving, responsive to removal of a DIMM from the DIMM socket, a reduction in pressure exerted on the spring loaded notch pin and, responsive to the reduction in pressure, electrically coupling the memory module signal line to a ground reference voltage through the off-die termination component.

9. The off-die termination module of claim 7 wherein the off-die termination component comprises part of the DIMM socket.

10. The off-die termination module of claim 7 wherein the off-die termination component is implemented on the PCB.

11. The off-die termination module of claim 7 wherein the spring loaded notch pin is located in a guide notch location of the DIMM socket.

12. The off-die termination module of claim 7 wherein the off-die termination component comprises:
a termination resistor component, wherein a spring of the spring loaded notch pin is configured to electrically couple the memory module signal line to a ground reference voltage through the termination resistor component upon removal of a DIMM from the DIMM socket.

13. The off-die termination module of claim 12 wherein the termination resistor component comprises a programmable resistor network.

14. The off-die termination module of claim 12 wherein the termination resistor component comprises a variable resistor.

15. A computer memory subsystem including off-die termination of memory module signal lines, the computer memory subsystem comprising:
a memory controller; and
a Dual In-Line Memory Module ('DIMM') socket installed on a printed circuit board ('PCB'), the DIMM socket electrically coupled to the memory controller via a memory module signal line; and
an off-die termination module comprising:
an off-die termination component configured to terminate the memory module signal line upon activation; and
a spring loaded notch pin implemented as part of the DIMM socket, the spring loaded notch pin configured to toggle activation of the off-die termination component in dependence upon presence of a DIMM in the DIMM socket including activating the off-die termination component upon removal of a DIMM from the DIMM socket and deactivating the off-die termination component upon installation of a DIMM in the DIMM socket.

16. The computer memory subsystem of claim 15 wherein the spring loaded notch pin is configured to toggle activation of the off-die termination component in dependence upon presence of a DIMM in the DIMM socket by, receiving, responsive to removal of a DIMM from the DIMM socket, a reduction in pressure exerted on the spring loaded notch pin and, responsive to the reduction in pressure, electrically coupling the memory module signal line to a ground reference voltage through the off-die termination component.

17. The computer memory subsystem of claim 15 wherein the off-die termination component comprises part of the DIMM socket.

18. The computer memory subsystem of claim 15 wherein the off-die termination component is implemented on the PCB.

19. The computer memory subsystem of claim 15 wherein the spring loaded notch pin is located in a guide notch location of the DIMM socket.

20. The computer memory subsystem of claim 15 wherein the off-die termination component further comprises:
a termination resistor component, wherein a spring of the spring loaded notch pin is configured to electrically couple the memory module signal line to a ground reference voltage through the termination resistor component upon removal of a DIMM from the DIMM socket.

* * * * *